(12) United States Patent
Yamashita

(10) Patent No.: US 6,707,793 B1
(45) Date of Patent: Mar. 16, 2004

(54) BUTTON TELEPHONE APPARATUS AND INTERNET COMMUNICATION SYSTEM

(75) Inventor: Hideo Yamashita, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 0 days.

(21) Appl. No.: 09/517,507

(22) Filed: Mar. 2, 2000

(30) Foreign Application Priority Data

Mar. 4, 1999 (JP) ............................................. 11-057302

(51) Int. Cl.[7] .............................................. H04L 12/64
(52) U.S. Cl. ...................................... 370/237; 370/352
(58) Field of Search ................................ 370/352, 356, 370/237, 238, 401

(56) References Cited

U.S. PATENT DOCUMENTS

| | | | | |
|---|---|---|---|---|
| 6,064,653 A | * | 5/2000 | Farris | 370/237 |
| 6,292,478 B1 | * | 9/2001 | Farris | 370/352 |
| 6,389,005 B1 | * | 5/2002 | Cruickshank | 370/352 |
| 6,430,178 B1 | * | 8/2002 | Yahiro | 370/356 |
| 6,449,259 B1 | * | 9/2002 | Allain et al. | 370/253 |
| 6,452,922 B1 | * | 9/2002 | Ho | 370/352 |

FOREIGN PATENT DOCUMENTS

| | | |
|---|---|---|
| JP | 9-168065 | 6/1997 |
| JP | 10-98548 | 4/1998 |
| JP | 10-164129 | 6/1998 |
| JP | 10-210080 | 8/1998 |
| JP | 10-327195 | 12/1998 |
| JP | 11-177686 | 7/1999 |
| JP | 11-225206 | 8/1999 |

* cited by examiner

*Primary Examiner*—Min Jung
(74) *Attorney, Agent, or Firm*—Foley & Lardner

(57) ABSTRACT

An Internet communication system is disclosed, that comprises a plurality of ISDN (Integrated Services Digital network) lines, an Internet network connected to the ISDN lines using IP (Internet Protocol) as a common protocol, at least one button telephone apparatus connected to the ISDN lines, and at least one telephone unit connected to the button telephone apparatus, wherein the button telephone apparatus has a selecting means for selecting a conventional telephone function or an Internet telephone function, wherein when the selecting means selects the Internet telephone function, the button telephone apparatus converts dial data received from the telephone unit into an IP address, the dial data representing a call destination, converts data of the audio signal received from the telephone unit into IP packets, and transmits the IP packets to the Internet network.

17 Claims, 2 Drawing Sheets

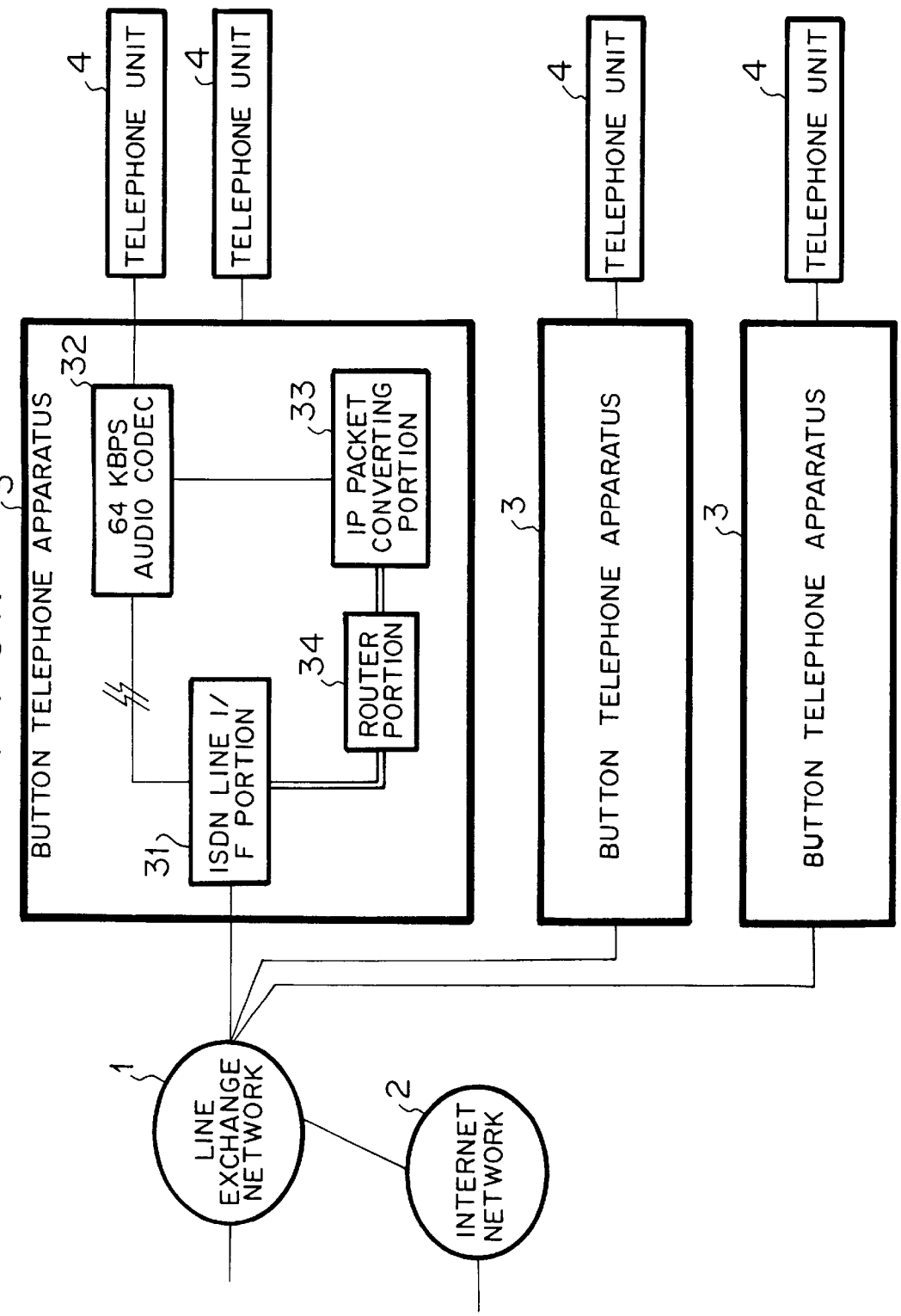

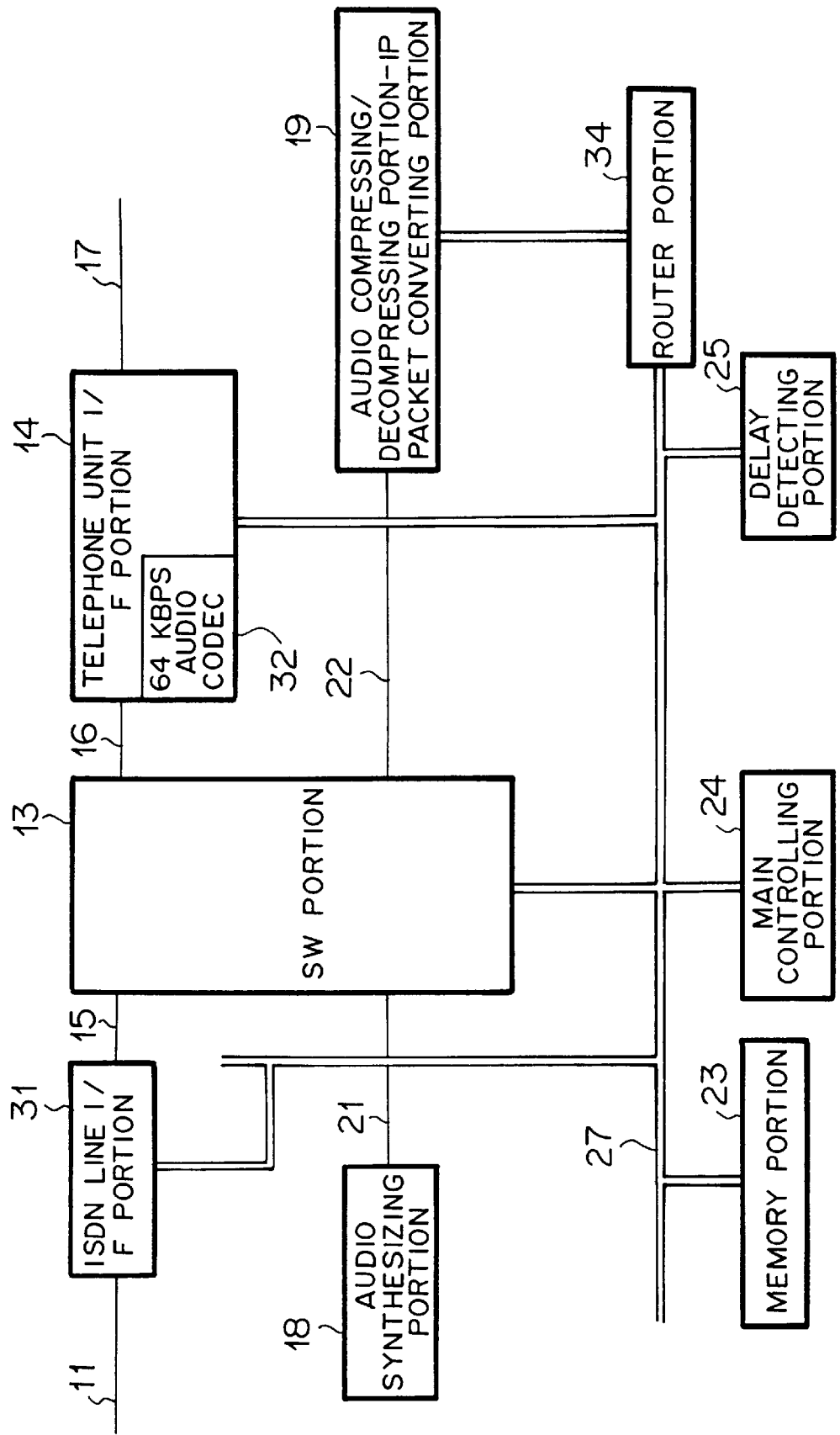

BUTTON TELEPHONE APPARATUS AND INTERNET COMMUNICATION SYSTEM

BACKGROUND OF THE INVENTION

1. Field of the Invention

The present invention relates to a button telephone apparatus (key-system) and an Internet communication system, in particular, those that bidirectionally exchange telephone audio packets between a conventional Internet network (in a narrow sense) and a button telephone apparatus (key-system) through a public telephone network corresponding to the ISDN (Integrated Services Digital network).

2. Description of the Related Art

Conventionally, from a view point of low cost of a long distance communication, as an audio communication network, a system using an Internet network has been developed.

Internet networks are roughly categorized as an Internet network in a broad sense and an Internet network in a narrow sense. In the former Internet network, various networks are connected regardless of their modes. On the other hand, in the later Internet network, with a source of ARPT (Advanced Research Projects Agency) NET, IP (Internet Protocol) is used as a common protocol. The above-described Internet network is categorized as the latter (namely, an Internet network in a narrow sense).

As a first related art reference of an audio communication system using the latter type Internet network, a technology of a service provider that provides the user with a connection service to an Internet network is disclosed as Japanese Patent Laid-Open Publication No. 10-98548. In the first related art reference, the delay time of transmission/reception packets in the Internet network is measured by comparing the transmission time of the packets with the reception time thereof. When the delay exceeds a predetermined time period (in other words, if a call cannot be transmitted through the Internet network due to congestion), as a user service, the service provider informs the user of a message that represents "SERVICE IS CURRENTLY NOT AVAILABLE".

As a second related art reference disclosed as Japanese Patent Laid-Open Publication No. 10-164129, a delay time is detected in a similar manner as the first related art reference (Japanese Patent Laid-Open Publication No. 10-98548). In the second related art reference, corresponding to the amount of the delay time, part of received packets are deleted.

In the above-described audio communication system, only the Internet network is used as a communication medium.

In other words, in such related art references, a structure of which the Internet network is used as a new communication network along with the conventional telephone exchange network is not used.

Thus, countermeasures against congestion of the Internet network are required. When the Internet network is used, depending on the congestion thereof, packets cannot be transmitted and received. Alternatively, the data quality of a call may remarkably deteriorate.

Although the above-described related art references disclosed as Japanese Patent Laid-Open Publications Nos. 10-98548 and 10-164129 are technologies against such countermeasures, they do not provide substantial solutions against deterioration of communication environment due to congestion of the network.

In other words, if the user should make an urgent call, the technology of the first related art reference disclosed as Japanese Patent Laid-Open Publication No. 10-98548 does not satisfy the user's needs. In addition, when the user hears a message "SERVICE IS CURRENTLY NOT AVAILABLE", he or she cannot know the thing to do next.

In the second related art reference disclosed as Japanese Patent Laid-Open Publication No. 10-164129, since part of audio data of the user is discarded. In this case, an important part of the audio data may be lost. In other words, the system cannot determine which of part of data is important for the user.

Thus, it cannot be said that such related art references provide the user with sufficient services. In other words, low cost communication has tradeoffs of urgent communication request and important data. Consequently, the user cannot be satisfied with such a service.

To solve such a problem, according to the present invention, a conventional telephone exchange network is still used. In addition, the Internet network can be selectively used. When audio data should be transmitted on real time basis, if it cannot be transmitted through the Internet network, the conventional telephone exchange network that has a stable communication quality is used. Thus, the user's convenience can be consistent with high quality of data communication.

SUMMARY OF THE INVENTION

The present invention is made from the above-described point of view. An object of the present invention is to provide an Internet communication system that allows audio data to be securely to be received and transmitted without a fluctuation of data quality depending on a time zone.

A first aspect of the present invention is an Internet communication system, comprising a plurality of ISDN (Integrated Services Digital network) lines, an Internet network connected to said ISDN lines using IP (Internet Protocol) as a common protocol, at least one button telephone apparatus connected to said ISDN lines, and at least one telephone unit connected to said button telephone apparatus, wherein said button telephone apparatus has a selecting means for selecting a conventional telephone function or an Internet telephone function, wherein when the selecting means selects the Internet telephone function, said button telephone apparatus converts dial data received from said telephone unit into an IP address, the dial data representing a call destination, converts data of the audio signal received from said telephone unit into IP packets, and transmits the IP packets to said Internet network, and wherein when said button telephone apparatus determines that said Internet network of the call destination is in a congestion state, the selecting means selects the conventional telephone function and re-transmits the audio data received from said telephone unit to the same call destination.

A second aspect of the present invention is a button telephone apparatus, connected to at least one telephone unit, for communicating with a plurality of ISDN (Integrated Services Digital network) lines and with an Internet network connected to the ISDN lines with IP (Internet Protocol) as a common protocol, comprising selecting means for selecting a conventional telephone function or an Internet telephone function, wherein when said selecting means selects the Internet telephone function, said button telephone apparatus converts dial data received from said telephone unit into an IP address, the dial data representing a call destination, converts data of the audio signal received from said telephone unit into IP packets, and transmits the IP packets to said Internet network, and wherein when said button telephone apparatus determines that said Internet network of the call destination is in a congestion state, said selecting means selects the conventional telephone function and re-transmits the audio data received from said telephone unit to the same call destination.

In other words, according to the present invention, the button telephone apparatus has two functions that are a conventional telephone function and an Internet telephone function. The user can selectively use one of these functions. When the user uses the Internet telephone function, the apparatus detects the delay of transmitted packets so as to determine whether or not the Internet network congests. When the congestion state of the Internet network exceeds a predetermined level, the apparatus automatically switches the Internet network to a ISDN line exchange network. Corresponding to dial data that was used for the Internet network, the call is re-dialed to the line exchange network. Thus, the audio data of the user can be automatically re-originated.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 a block diagram showing the overall structure of an Internet communication system according to an embodiment of the present invention; and FIG. 2 is a block diagram showing the detailed structure of a button telephone apparatus contained in the Internet communication system according to the embodiment of the present invention.

DESCRIPTION OF PREFERRED EMBODIMENTS

Next, with reference to the accompanying drawings, an embodiment of the present invention will be described.

FIG. 1 is a block diagram showing the overall structure of an Internet communication system according to an embodiment of the present invention.

In FIG. 1, a line exchange network 1 is an ISDN (Integrated Services Digital network) public communication network.

An Internet network 2 is an Internet network in a narrow sense. In other words, as a source of ARPANET, the Internet protocol (abbreviated as IP) is used as a common protocol.

A button telephone apparatus 3 connected to the line exchange network 1 is a telephone switching apparatus. In FIG. 1, for simplicity, only one button telephone apparatus 3 is shown. However, in reality, at least one button telephone apparatus 3 can be connected to the line exchange network 1.

A plurality of telephone units 4 are connected to each of the button telephone apparatuses 3. In the following description, for simplicity, only one telephone unit 4 and only one button telephone apparatus 3 are considered. The telephone unit 4 is a telephone unit that sends an audio signal and command data to the button telephone apparatus 3. The telephone unit 4 may be a button type telephone unit.

The button telephone apparatus 3 comprises an ISDN line I/F portion 31, an audio CODEC 32, an IP packet converting portion 33, and a router portion 34. The ISDN line I/F portion 31 is connected to the line exchange network 1. The ISDN line I/F portion 31 is an interface portion that deals with both a conventional telephone function and an Internet telephone function. The audio CODEC 32 is disposed between the ISDN line I/F portion 31 and the telephone unit 41. The audio CODEC 32 converts an audio signal into a 64 kbps PCM signal. The IP packet converting portion 33 is disposed between the audio CODEC 32 and the router portion 34. The IP packet converting portion 33 compresses the PCM audio signal into a narrow band audio signal corresponding to the Internet network decodes an encoded signal. The router portion 34 is disposed between the IP packet converting portion 33 and the ISDN line I/F portion 31. The router portion 34 uses TCP (Transmission Control Protocol)/IP that is a communication protocol on the Internet network. The router portion 34 converts dial data received from the telephone unit 4 into an IP address and repeats packets to the Internet network.

FIG. 2 is a block diagram showing the detailed structure of the button telephone apparatus contained in the Internet communication system according to the embodiment of the present invention.

The button telephone apparatus according to the embodiment of the present invention comprises a main controlling portion 24, a common control bus 27, a telephone line 11, an ISDN line I/F portion 31, PCM highways 15, 16, 21, and 22, a switcher (SW portion) 13, a telephone unit I/F portion 14, and an audio synthesizing portion 18. The telephone line 11 is connected to the ISDN line exchange network 1. The ISDN line I/F portion 31 connects the line exchange network 1 with the switcher 13. The PCM highways 15, 16, 21, and 22 transmit 64-kbps multiplexed audio signal data. The switcher (SW) portion 13 selects an audio communication path using the PCM highways 15, 16, 21, and 22. The telephone unit I/F portion 14 connects to the PCM highway 16 and the telephone unit 4 through a connection line 17. The telephone unit I/F portion 14 terminates and originates a call as a 64 kbps audio signal that is encoded and decoded by the audio CODEC 32. The audio synthesizing portion 18 outputs an audio guidance, a message, and so forth at 64 kbps under the control of the main controlling portion 24.

The button telephone apparatus 3 further comprises an IP packet converting portion—audio compressing/decompressing portion 19, a router portion 34, a delay detecting portion 25, a main controlling portion 24, and a memory portion 23. The IP packet converting portion—audio compressing/decompressing portion 19 connects the PCM highway 22 and the router portion 34, converts 64 kbps audio signal data into IP packets, converts IP packets into 64 kbps audio signal data, compresses data for the packetizing process, and decompresses data for the depacketizing process. The router portion 34 connects a call to the Internet network 2 corresponding to TCP/IP protocol. The delay detecting portion 25 measures intervals of IP packets received from the router portion 34. The main controlling portion 24 controls all structural portions of the apparatus. When a call is originated using the Internet, the main controlling portion 24 sends dial data received from the telephone unit to the router portion 34. The memory portion 23 stores destination telephone numbers, an IP address conversion table, redial data for each telephone unit.

Next, with reference to FIGS. 1 and 2, the operation of the Internet communication system according to the embodiment will be described.

The number of channels that the ISDN line I/F portion 31 shown in FIGS. 1 and 2 handles is for example 2B or 30B.

In addition, the ISDN line I/F portion 31 can handle a plurality of ISDN lines. In the button telephone apparatus 3, the switcher (SW portion) 13 selects one of the ISDN lines.

The ISDN line I/F portion 31 shown in FIG. 1 selects a conventional telephone function or an Internet telephone function. In the conventional telephone function, the ISDN line I/F portion 31 communicates with the line exchange network 1 using a 64 kbps PCM encoded signal. In the Internet telephone function, when a call is originated, the IP packet converting portion 33 compresses PCM audio signal data. When a call is terminated, the IP packet converting portion 33 decodes (decompresses) received audio signal data. The router portion 34 transmits IP packets to the Internet network 2.

Thus, when the button telephone apparatus 3 communicates with the Internet network 2 (namely, uses the Internet telephone function), dial data sent from the telephone unit 4 is converted into an IP address by the router portion 34.

Thus, the Internet communication system according to the embodiment of the present invention has two modes. In the first mode, the conventional telephone function is used. In the second mode, the Internet telephone function is used.

In other words, in the first mode, after the audio CODEC 32 converts an analog audio signal received from the telephone unit 4 into a 64 kbps PCM signal, the 64 kbps PCM signal is transmitted to the line exchange network 1. In the second mode, a 64 kbps PCM audio signal is compressed as IP packetized audio data and then transmitted to the Internet network 2. Thus, one of the two modes can be selected.

When the user makes a call, he or she can select one of the two modes. For example, the user selects a desired mode using a route selection code on the telephone unit 4. When the telephone unit 4 is a button type telephone unit, he or she can select a desired mode using an allocated button on the telephone unit.

When a call is terminated from the ISDN line, it can be determined whether the call is an audio signal or a data signal. Thus, when the call is received from the ISDN line, depending on whether it is an audio signal or a data signal, an audio path or a data path is selected, respectively.

When the conventional telephone function is selected, a communication path is formed between the telephone unit I/F portion 14 and the ISDN line I/F portion 31 through the PCM highway 15, the SW portion 13, and the PCM highway 16. Thus, the PCM audio signal data can be received. In other words, the telephone unit 4 sounds corresponding to a termination call received through the connection line 17. Thus, since the telephone unit 4 is connected to the line exchange network 1, the user can communicate with a calling party.

On the other hand, when the Internet telephone function is selected, the 64 kbps audio signal is sent from the telephone unit I/F portion 14 to the audio compressing/decompressing portion 19 by a communication path control of the SW portion 13. Since the audio signal cannot be transmitted on real time basis through the Internet network, the audio signal is compressed to a signal of the minimum available frequency band (for example, 8 kbps) by the audio compressing/decompressing portion—IP packet converting portion 19 and then sent as audio packet data to the router portion 34.

The router portion 34 handles audio packets as TCP/IP data (namely, IP packets) on the Internet network. In addition, the router portion 34 extracts an IP address of the communication destination from the memory portion 23 under the control of the main controlling portion 24 using the destination dial data and the IP address conversion table, transmits the IP packets through the common control bus 27 using B channel of the ISDN line I/F portion 31 as B channel packet communication, and communicates with the receiving party corresponding to the TCP/IP protocol through the Internet network 2.

However, in the Internet communication system according to the embodiment, a line connection to the Internet network may be performed by the user and through the Internet service provider.

When the user selects a line connection to the Internet network, because of data congestion thereon, the data delay may become critical depending on a time zone. Thus, in this case, the user cannot smoothly make an audio communication with a desired party. To solve such a problem, in the Internet communication system according to the embodiment, the delay detecting portion 25 of the calling side measures intervals of received audio packets sent from the ISDN line I/F portion 31 to the router portion 34. When the delay time exceeds a first predetermined time period or successively exceeds a second predetermined time period, the main controlling portion 24 determines that the audio communication is practically not available. Thus, the main controlling portion 24 suspends the audio communication through the Internet network 2 and transmits a predetermined suspension packet to the destination. Normally, the second predetermined time period is smaller than the first predetermined time period.

When the main controlling portion 24 suspends the audio communication, in addition to the suspension packet, the audio synthesizing portion 18 sends an audio guidance to the telephone unit 4 through the SW portion 13 and the telephone unit I/F portion 14. The guide message is for example "PLEASE WAIT A MOMENT.", "LINE IS NOW BEING SWITCHED. PLEASE, WAIT A MOMENT." or "LINE IS NOW BEING SWITCHED TO CONVENTIONAL TELEPHONE LINE. PLEASE WAIT A MOMENT."

When the main controlling portion 24 suspends the audio communication, a call is re-originated corresponding to destination dial data stored in the memory portion 23 through the line exchange network 1 using the conventional telephone function on the same channel of the ISDN line. When the ISDN line I/F portion 31 detects a response of the receiving party, the main controlling portion 24 controls the SW portion 13 to connect the response to the telephone unit I/F portion 14.

Likewise, when the called side receives the suspension packet, the main controlling portion 24 cancels the audio communication through the Internet network 2. As with the calling side, the audio synthesizing portion 18 sends an audio message to the telephone unit 4 through the SW portion 13 and the telephone unit I/F portion 14. The audio message is for example "PLEASE WAIT A MOMENT.", "LINE IS NOW BEING SWITCHED. PLEASE, WAIT A MOMENT." or "LINE IS NOW BEING SWITCHED TO CONVENTIONAL TELEPHONE LINE".

Thereafter, when the ISDN line I/F portion 31 detects a call received from the calling side through the line exchange network 1, the ISDN line I/F portion 31 controls the SW 13 to connect the call to the telephone line I/F portion 14.

According to the embodiment of the present invention, when an audio communication congests on the Internet network, the audio communication is temporarily suspended. Thereafter, the line exchange network having stable data quality is selected. The remote parity is re-dialed through the line exchange network. However, the Internet network tends to congest in a particular time zone. Thus, after a busy state of the Internet network is detected, it is preferred to re-originate a call after an interval of a predetermined time period. Alternatively, after a busy state is detected, if a call is re-originated within a third predetermined time period, it may be transmitted through the ISDN line exchange network. In other words, only the conventional telephone function can be forcedly selected.

As described above, according to the Internet communication system of the present invention, the conventional telephone function and the Internet telephone function can be selectively used. In addition, the system determines whether or not an audio communication congests on the Internet network. When a congestion takes place on the Internet network, the system automatically switches the audio communication from the Internet network to the conventional telephone function. Thus, unlike with the conventional system, it is not necessary to disconnect the line, switch the line to the conventional line exchange network, and re-dial the receiving party.

When the Internet telephone function is switched to the conventional telephone function, since the same channel of the ISDN line is used, it is not necessary to provide a dedicated channel and a dedicated line.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An Internet communication system, comprising:
a plurality of ISDN (Integrated Services Digital network) lines;
an Internet network connected to said ISDN lines using IP (Internet Protocol) as a common protocol;
at least one button telephone apparatus connected to said ISDN lines; and
at least one telephone unit connected to said button telephone apparatus,
wherein said button telephone apparatus has:
selecting means for selecting a conventional telephone function or an Internet telephone function,
wherein when the selecting means selects the Internet telephone function, said button telephone apparatus converts dial data received from said telephone unit into an IP address, the dial data representing a call destination, converts audio signal data received from said telephone unit into IP packets, and transmits the IP packets to said Internet network, and
wherein when said button telephone apparatus determines that said Internet network of the call destination is in a congestion state, the selecting means selects the conventional telephone function and re-transmits the audio data received from said telephone unit to the same call destination; and
wherein said button telephone apparatus comprises:
an audio synthesizing portion for generating a predetermined audio guidance message,
wherein when said button telephone apparatus of a calling party determines that said Internet network of the call destination is in a congestion state that exceeds a predetermined allowable limit and switches the Internet telephone function to the conventional telephone function, said calling party button telephone apparatus transmits a predetermined suspension packet and the audio synthesizing portion sends the audio guidance message to said telephone unit, the audio guidance message representing that an audio communication is currently being suspended, and
wherein when said telephone unit of a called party receives the predetermined suspension packet while said telephone unit is communicating in a call in the Internet telephone function, another audio synthesizing portion of said called party sends another audio guidance message to the called party telephone unit, the another audio guidance message representing that the call is currently being suspended.

2. The Internet communication system as set forth in claim 1,
wherein said button telephone apparatus has:
a delay time detecting portion for measuring intervals of audio packets of a call in a communication of the Internet telephone function,
wherein when the delay time detected by the delay time detecting portion exceeds a first predetermined time period or successively exceeds a second predetermined time period, said button telephone apparatus determines that the congestion state exceeds a predetermined allowable limit.

3. The Internet communication system as set forth in claim 2,
wherein when a call is originated, said button telephone apparatus selects the conventional telephone function or the Internet telephone function corresponding to a command that is input from said telephone unit, and
wherein when a call is terminated, said button telephone apparatus selects the telephone function or the Internet telephone function corresponding to an analyzed result of the received signal.

4. Internet communication system as set forth in claim 2,
wherein said button telephone apparatus has:
storing means for storing dial data received from said telephone unit when a call is originated in the Internet telephone function, and
wherein after said button telephone apparatus switches the Internet telephone function to the conventional telephone function, when the call is re-originated, said button telephone apparatus uses the dial data stored in the storing means as the call destination.

5. The Internet communication system as set forth in claim 2,
wherein said button telephone apparatus has:
an ISDN line interface portion for switching the conventional telephone function to the Internet telephone function or vice versa and making an audio communication with said ISDN lines;
a CODEX for converting a digital audio signal into an analog audio signal or vice versa;
a router portion for making an audio communication with said Internet network corresponding to TCP/IP as an Internet protocol; and
an IP converting portion for converting an audio signal into IP packet data.

6. The Internet communication system as set forth in claim 1,
wherein when a call is originated, said button telephone apparatus selects the conventional telephone function or the Internet telephone function corresponding to a command that is input from said telephone unit, and wherein when a call is terminated, said button telephone apparatus selects the telephone function or the Internet telephone function corresponding to an analyzed result of the received signal.

7. The Internet communication system as set forth in claim 6,
wherein said button telephone apparatus has:
storing means for storing dial data received from said telephone unit when a call is originated in the Internet telephone function, and
wherein after said button telephone apparatus switches the Internet telephone function to the conventional telephone function, when the call is re-originated, said button telephone apparatus uses the dial data stored in the storing means as the call destination.

8. The Internet communication system as set forth in claim 6,
wherein said button telephone apparatus has:
an ISDN line interface portion for switching the conventional telephone function to the Internet telephone function or vice versa and making an audio communication with said ISDN lines;
a CODEX for converting a digital audio signal into an analog audio signal or vice versa;
a router portion for making an audio communication with said Internet network corresponding to TCP/IP as an Internet protocol; and
an IP converting portion for converting an audio signal into IP packet data.

9. The Internet communication system as set forth in claim 1,
wherein said button telephone apparatus has:
storing means for storing dial data received from said telephone unit when a call is originated in the Internet telephone function, and
wherein after said button telephone apparatus switches the Internet telephone function to the conventional telephone function, when the call is re-originated, said button telephone apparatus uses the dial data stored in the storing means as the call destination.

10. The Internet communication system as set forth in claim 9,
wherein said button telephone apparatus has:
an ISDN line interface portion for switching the conventional telephone function to the Internet telephone function or vice versa and making an audio communication with said ISDN lines;
a CODEX for converting a digital audio signal into an analog audio signal or vice versa;
a router portion for making an audio communication with said Internet network corresponding to TCP/IP as an Internet protocol; and
an IP converting portion for converting an audio signal into IP packet data.

11. The Internet communication system as set forth in claim 1,
wherein said button telephone apparatus has:
an ISDN line interface portion for switching the conventional telephone function to the Internet telephone function or vice versa and making an audio communication with said ISDN lines;
a CODEX for converting a digital audio signal into an analog audio signal or vice versa;
a router portion for making an audio communication with said Internet network corresponding to TCP/IP as an Internet protocol; and
an IP converting portion for converting an audio signal into IP packet data.

12. The Internet communication system as set forth in claim 1,
wherein said button telephone apparatus has:
storing means for storing dial data received from said telephone unit when a call is originated in the Internet telephone function, and
wherein after said button telephone apparatus switches the Internet telephone function to the conventional telephone function, when the call is re-originated, said button telephone apparatus uses the dial data stored in the storing means as the call destination.

13. The Internet communication system as set forth in claim 1,
wherein said button telephone apparatus has:
an ISDN line interface portion for switching the conventional telephone function to the Internet telephone function or vice versa and making an audio communication with said ISDN lines;
a CODEX for converting a digital audio signal into an analog audio signal or vice versa;
a router portion for making an audio communication with said Internet network corresponding to TCP/IP as an Internet protocol; and
an IP converting portion for converting an audio signal into IP packet data.

14. A button telephone apparatus, connected to at least one telephone unit, for communicating with a plurality of ISDN (Integrated Services Digital network) lines and with an Internet network connected to the ISDN lines with IP (Internet Protocol) as a common protocol, comprising:
selecting means for selecting a conventional telephone function or an Internet telephone function,
wherein when said selecting means selects the Internet telephone function, said button telephone apparatus converts dial data received from said telephone unit into an IP address, the dial data representing a call destination, converts audio signal data received from said telephone unit into IP packets, and transmits the IP packets to said Internet network, and
wherein when said button telephone apparatus determines that said Internet network of the call destination is in a congestion state, said selecting means selects the conventional telephone function and re-transmits the audio data received from said telephone unit to the same call destination
wherein said button telephone apparatus comprises:
an audio synthesizing portion for generating a predetermined audio guidance message,
wherein when said button telephone apparatus of a calling party determines that said Internet network of the call destination is in a congestion state that exceeds a predetermined allowable limit and switches the Internet telephone function to the conventional telephone function, said calling party button telephone apparatus transmits a predetermined suspension packet and the audio synthesizing portion sends the audio guidance message to said telephone unit, the audio guidance message representing that an audio communication is currently being suspended, and
wherein when said telephone unit of a called party receives the predetermined suspension packet while said telephone unit is communicating in a call in the Internet telephone function, another audio synthesizing portion of said called party sends another audio guidance message to the called party telephone unit, the another audio guidance message representing that the call is currently being suspended.

15. The button telephone apparatus as set forth in claim 14, further comprising:

a delay time detecting portion for measuring intervals of audio packets of a call in a communication of the Internet telephone function, wherein when the delay time detected by the delay time detecting portion exceeds a first predetermined time period or successively exceeds a second predetermined time period, the button telephone apparatus determines that the congestion state exceeds a predetermined allowable limit.

16. The button telephone apparatus as set forth in claim 15, further comprising:

an ISDN line interface portion for switching the conventional telephone function to the Internet telephone function or vice versa and making an audio communication with the ISDN lines;

a CODEX for converting a digital audio signal into an analog audio signal or vice versa;

a router portion for making an audio communication with the Internet network corresponding to TCP/IP as an Internet protocol; and an IP converting portion for converting an audio signal into IP packet data.

17. The button telephone apparatus as set forth in claim 14, further comprising:

an ISDN line interface portion for switching the conventional telephone function to the Internet telephone function or vice versa and making an audio communication with the ISDN lines;

a CODEX for converting a digital audio signal into an analog audio signal or vice versa;

a router portion for making an audio communication with the Internet network corresponding to TCP/IP as an Internet protocol; and an IP converting portion for converting an audio signal into IP packet data.

* * * * *